US008854775B2

(12) United States Patent
Head

(10) Patent No.: US 8,854,775 B2

(45) Date of Patent: Oct. 7, 2014

(54) TRANSFORMER ASSEMBLY AND METHODS OF USE

(76) Inventor: Mark Head, Bayfield, CO (US)

( * ) Notice: Subject to any disclaimer, the term of this patent is extended or adjusted under 35 U.S.C. 154(b) by 377 days.

(21) Appl. No.: 13/195,725

(22) Filed: Aug. 1, 2011

(65) Prior Publication Data

US 2011/0292563 A1 Dec. 1, 2011

Related U.S. Application Data

(63) Continuation-in-part of application No. 12/098,336, filed on Apr. 4, 2008, now abandoned.

(51) Int. Cl.
*H02B 5/00* (2006.01)
*H02B 13/00* (2006.01)

(52) U.S. Cl.
USPC ............. 361/35; 361/603; 361/620; 335/167; 335/113

(58) Field of Classification Search
USPC ............ 361/268, 35, 603, 620; 335/253, 167, 335/113, 77
See application file for complete search history.

(56) References Cited

U.S. PATENT DOCUMENTS

| | | | | |
|---|---|---|---|---|
| 1,985,638 | A * | 12/1934 | Kerr, Jr. et al. | 307/9.1 |
| 3,443,113 | A | 5/1969 | Goodman et al. | |
| 3,482,108 | A | 12/1969 | Steinmayer | |
| 3,488,563 | A | 1/1970 | Carruthers et al. | |
| 3,519,838 | A | 7/1970 | Swerdlow | |
| 3,728,656 | A | 4/1973 | Neuber | |
| 3,794,963 | A | 2/1974 | Cooper, Jr. | |
| 3,860,314 | A | 1/1975 | Vandiveer et al. | |
| 4,360,849 | A * | 11/1982 | Harris et al. | 361/39 |
| 4,787,855 | A | 11/1988 | Finke | |
| 4,952,898 | A * | 8/1990 | Nelson et al. | 336/65 |
| 5,081,367 | A | 1/1992 | Smith et al. | |
| 5,239,441 | A | 8/1993 | Fox et al. | |
| 5,349,144 | A | 9/1994 | Baragar | |
| 5,427,538 | A | 6/1995 | Knapp et al. | |
| 5,574,378 | A * | 11/1996 | Meyer et al. | 324/541 |
| 5,587,873 | A * | 12/1996 | Sakai et al. | 361/603 |
| 5,952,617 | A * | 9/1999 | Bergstrom | 174/152 R |
| 6,215,653 | B1 | 4/2001 | Cochran et al. | |
| 6,272,733 | B1 | 8/2001 | Baker, Jr. | |
| 2006/0105626 | A1 | 5/2006 | Scott | |

* cited by examiner

*Primary Examiner* — Zeev V Kitov

(74) *Attorney, Agent, or Firm* — Leyendecker & Lemire, LLC

(57) ABSTRACT

A transformer assembly is described. Embodiments of the transformer assembly are adapted to facile disconnection and removal of a transformer from the transformer assembly without disconnecting service lines from the transformer assembly. Moreover, embodiments of the transformer assembly are adapted to de-energize the transformer without interrupting primary power to downstream devices, and to safely and easily park energized or de-energized connectors such as loadbreak elbows during transformer maintenance. Methods of using the transformer assembly are also described.

14 Claims, 4 Drawing Sheets

TRANSFORMER ASSEMBLY AND METHODS OF USE

The present application is a Continuation-In-Part (CIP) of U.S. patent application Ser. No. 12/098,336, filed 4 Apr. 2008 and having the same title and inventor as the present application. Accordingly, the present application claims priority to U.S. patent application Ser. No. 12/098,336.

FIELD OF THE INVENTION

The present invention relates generally to transformers used to distribute electric power, and to electrical connections used in conjunction with such transformers.

BACKGROUND

Systems for distributing electric power from generating facilities to users such as businesses and residences usually employ transformers to reduce voltage. Relatively low electrical potential delivered to residential and some business users is typically around 120 to 600 volts, whereas electric power is usually distributed at much higher voltage from generators to transformers located in the vicinity of users. Transformers are thus used to step voltage down from relatively high primary voltage to relatively low secondary voltage. Electric power at secondary voltage is typically distributed from transformers to meters, with one transformer typically serving multiple meters.

Underground primary power configurations presently in use for underground electrical power distribution typically include a junction box or similar device that provides a means for continuing a primary power line downstream in one or more directions, in addition to providing primary voltage to a transformer and a junction box or similar device. Transformers typically provide one source to extend primary voltage to a downstream primary device.

Maintenance or replacement of an underground transformer requires that it be de-energized by interrupting primary power to the transformer. Typically, with devices currently in use, a transformer is de-energized by disconnecting an upstream connection at primary voltage. Such a primary voltage connection sometimes comprises a loadbreak elbow and a bushing at a junction box or a transformer. Interrupting power by disconnecting a loadbreak elbow from a bushing not only de-energizes the transformer being modified, but usually interrupts power downstream as well. Thus, downstream electric power users have electric power interrupted, as do those users supplied by the transformer being serviced or modified.

Primary connections in transformer assemblies typically comprise loadbreak elbows adapted to disconnect from bushings in order to interrupt power to the transformer primary side. The loadbreak elbows are also adapted to readily reconnect with the bushings in order to reestablish primary power to the transformer. Loadbreak elbow and bushing connections are generally preferable to switches for use on the primary side because high voltage switches are vulnerable to arcing and other problems associated with interrupting high voltage circuits. Primary loadbreak elbows that have been disconnected from a transformer, but which are still energized, are challenging to store safely.

Line tools such as a shot gun enable electric utility workers to disconnect and maneuver high voltage loadbreak elbows without excessive danger caused by exposure to high voltage. Loadbreak elbow and bushing connections are thus widely accepted devices for providing relatively safe primary power connections in transformer assemblies.

In addition to requiring interruption of downstream primary power when de-energizing a transformer for maintenance or replacement, present day transformer design requires that connections between service wires and a transformer be electrically and physically disconnected at a secondary block of a transformer assembly, particularly where a transformer or secondary blocks are being removed or replaced. Such interruption frequently requires disconnecting three separate secondary or service wires for each meter, requiring disconnection of as many as 18 or more secondary or service wires before removing one transformer. Disconnecting and then reconnecting secondary or service wires for each meter is inefficient; it is frequently time consuming and tedious.

Underground primary power line configurations currently in use typically have a transformer and junction box positioned at separate locations. Thus a single transformer and single junction box sometimes requires two utility boxes in close proximity to each other, which can be unsightly.

In summary, underground primary power line configurations currently in use require that downstream primary service be interrupted when the transformer to be serviced or changed-out is de-energized. Moreover, a transformer in a typical contemporary assembly must be disconnected from an upstream junction box, transformer, or switch device and from individual secondary or services wires at a secondary block, in order to remove or replace the transformer. Having to replace both transformer connections and a plenitude of secondary block connection increases maintenance time, which increases the interval during which a transformer is de-energized. Downstream users can be deprived of electric power during this interval, if transformer is not in a loop configuration. Finally, underground primary systems may consist of transformers and junction boxes disposed at separate locations, sometimes requiring two utility boxes in close proximity of each other. Such configuration is an inefficient use of space and material, and is unnecessarily aesthetically disruptive.

DETAILED DESCRIPTION

Figure 1:
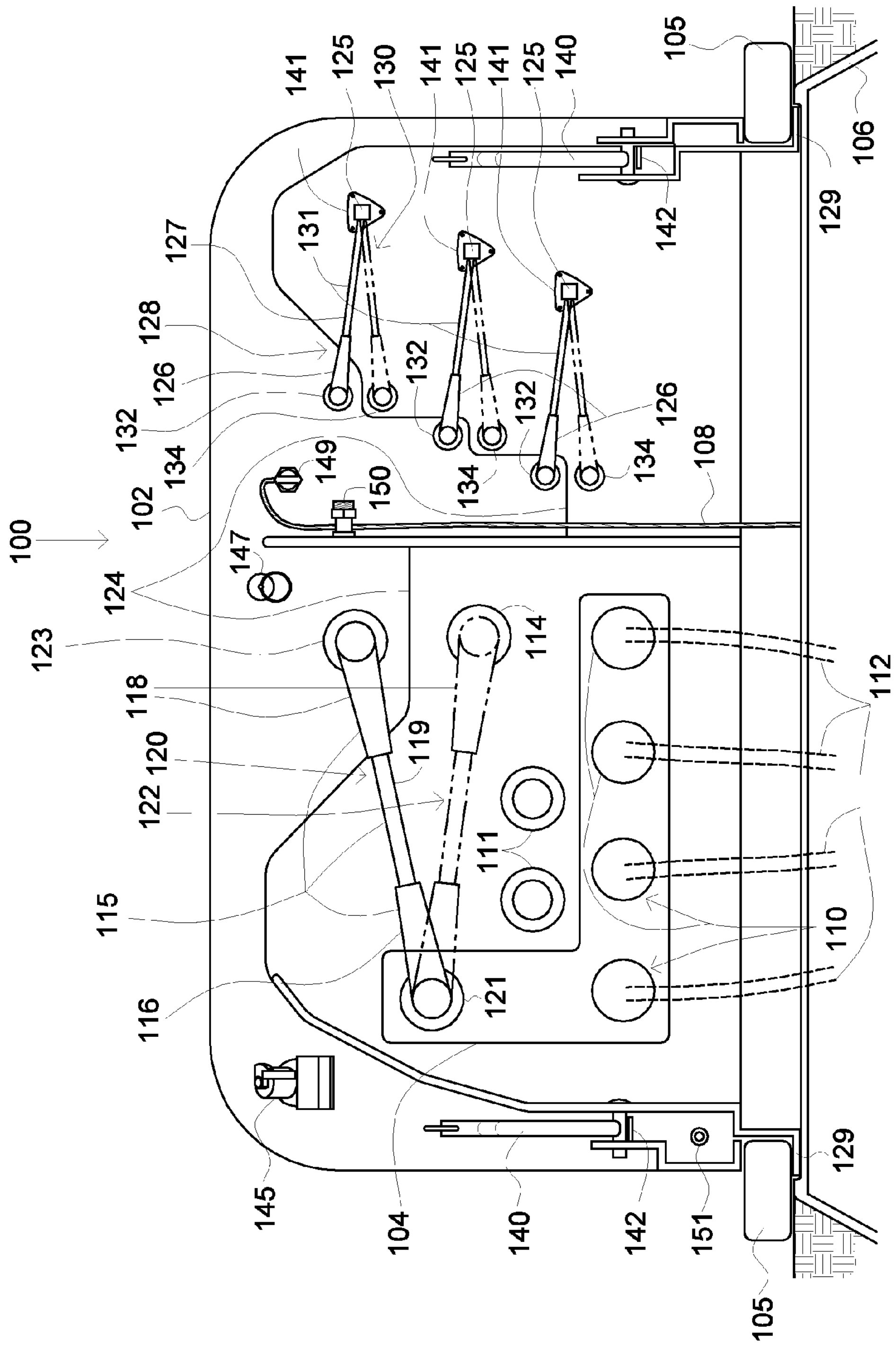
FIG. 1 is a front view of a transformer assembly according to one embodiment of the present invention.

Embodiments of the present invention include transformer assemblies comprising a primary junction module located in very close proximity to its respective transformer, forming a modular, compact integrated unit. So configured, a transformer, a medial wall and primary junction module can share a single mounting pad and ground sleeve, creating a single utility box assembly. Despite their close proximity, however, embodiments have primary junction modules and transformers that are modular and separable, such that a transformer can be readily removed from a transformer assembly with little or no disturbance to a primary junction module, and no interruption to downstream primary power. Embodiments of the present invention include secondary blocks and secondary connecting members. Embodiments of secondary blocks and secondary connecting members provide electrical connections between the transformer and service wires.

Embodiments comprise connections on the secondary side of the transformer assembly that enable interruption of secondary conductivity between a transformer and service wires by physically and electrically disconnecting the secondary connecting members from the transformer. Accordingly, the number of secondary connections that must be disconnected in order to remove or replace a transformer is typically reduced where the transformer serves multiple service wires, which provides a faster and more convenient alternative to the prior art practice of disconnecting each individual service wire from the secondary blocks.

Embodiments also comprise a transformer that is readily de-energized by interrupting primary power connectivity between the primary junction module and the transformer, without de-energizing the primary junction module. Primary power to a transformer is thus interrupted, but continues through the primary junction module to other downstream transformers and primary devices.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The terms "generally" and "substantially," as used in this specification and appended claims, mean mostly, or for the most part.

The term "approximately," as used in this specification and appended claims, refers to plus or minus 10% of the value given.

The term "about," as used in this specification and appended claims, refers to plus or minus 20% of the value given.

The term "couple" or "coupled" as used in this specification and appended claims refers to an indirect or direct connection between the identified elements, components, or objects. Often the manner of the coupling will be related specifically to the manner in which the two coupled elements interact.

The terms "directly coupled" or "coupled directly," as used in this specification and appended claims, refer to a physical connection between identified elements, components, or objects, in which no other element, component, or object resides between those identified as being directly coupled.

The term "compact integrated unit" as used in this specification and appended claims, refers to a transformer assembly wherein the individual components of the transformer assembly, including, but not limited to, a transformer, a primary junction module, parking ports, a primary connecting member, a secondary connecting member, and a secondary block, are adapted to fit together in very close proximity, as a relatively densely packed assembly. Such adaptation is typically embodied in complementary shapes of components, and complementary shaped adjacent sides of components, that allows the components to be assembled densely packed, in very close proximity, together. Embodiments of the present invention illustrated in FIGS. 1 and 2 exemplify the way that a transformer and other assembly components are adapted to fit in close proximity to form a compact integrated unit. In contrast, transformer assembly components disclosed in FIGS. 1-5 of U.S. Pat. No. 3,443,113 and FIG. 1 of U.S. Pat. No. 3,488,563 are not adapted to fit in close proximity or be densely packed together. Thus, the transformer assemblies of U.S. Pat. Nos. 3,443,113 and 3,488,563 are not compact integrated units, despite sharing a vault and not being separated by great distance. Some embodiments of compact integrated units are adapted to share a common mounting pad.

The terms "electrical connector," "electrical connector," "primary connector," and "secondary connector," as used in this specification and appended claims, refer to devices adapted to making electrical connections. Examples of electrical connectors include, but are not limited to, loadbreak elbows. Electrical connectors are typically, but not necessarily, disposed on the end of primary or secondary wire. Primary connectors are adapted to conduct primary voltage and secondary connectors are adapted to conduct secondary voltage.

The terms "parking port" or "parking ports," as used in this specification and the appended claims, refer to devices adapted to safely receive an energized electrical connector such as a loadbreak elbow, and that are electrical dead-ends, i.e. they are blind ports though which no current flows through even when an energized electrical connector is received thereupon. A parking port is not electrically connected to ground and does not participate in a closed electrical circuit, whether or not an energized electrical connector is received thereupon. An electrical connector received at parking port is said to be parked. A well insulated, dead-end bushing adapted to receive an energized loadbreak elbow is an example of a parking port. A primary parking port is adapted to safely receive an electrical connector energized at primary or lower voltage. A secondary parking port is adapted to safely receive an electrical connector energized at secondary or lower voltage. It is understood that a parking port must be relatively well insulated from its surroundings in order to safely receive an energized electrical connector. When an electrical connector is parked at a parking port, it creates a readily apparent visual indication that a circuit is open. Such visual indication is beneficial for utility workers who need to know the status of a circuit.

The term "primary junction module station," as used in this specification and appended claims, refers to a device disposed on a primary junction module and adapted to safely engage an electric connector such as a loadbreak elbow. The primary junction module station is in primary conductivity with a primary terminal on the primary junction module, and is adapted to engage a first primary loadbreak elbow.

The term "primary transformer station" as used in this specification and appended claims, refers to a device mounted on the transformer that is adapted to engage a primary connector, such as, but not limited to, a second primary connector of a primary feeder. The primary transformer station is a means by which a primary side of the transformer is energized. Accordingly, the transformer is typically, but not necessarily, energized when the second primary connector is installed on the primary transformer station, which is referred to as a first primary configuration.

The term "secondary transformer station" as used in this specification and appended claims, refers to a device mounted on the transformer and adapted to engage a secondary connector such as, but not limited to, a secondary loadbreak elbow. When the transformer is energized, the secondary transformer station is energized at a secondary voltage.

The terms "transformer" or "transformers," as used in this specification and appended claims, refers to step-down transformers familiar to persons of ordinary skill in the art, adapted to reduce electric power at a primary voltage to electric power at a secondary voltage. A primary side of a transformer comprises transformer primary windings and other transformer components that operate at primary voltage, and a secondary side of the transformer comprises secondary windings and other transformer components that operate at secondary voltage. A transformer typically comprises an enclosure that protects and contains components, such as windings and cooling fluid.

The term "primary conductivity," as used in this specification and appended claims, refers to electrical connectivity between structures such that electricity at primary voltage levels can be readily and substantially safely conducted between the structures. Structures that are in primary conductivity are electrically connected, and may or may not be actually conducting at electricity at primary voltage. Primary voltage is preferably greater than 1000 volts, more preferably greater than 1500 volts, still more preferably greater than 2000 volts, and most preferably falls in a range of 2400 volts to 10,000 volts.

The term "secondary conductivity," as used in this specification and appended claims, refers to electrical connectivity between structures such that electricity at secondary voltage can be readily and substantially safely conducted between the structures. Structures that are in secondary conductivity are electrically connected, and may or may not be actually conducting at electricity at secondary voltage. Secondary voltage is preferably less than 1000 volts and most preferably falls in a range of 100 volts to about 600 volts.

The terms "secondary block" or "secondary blocks," as used in this specification and the appended claims, refer to components typically found in transformer assemblies currently in use, and in embodiments of the present invention. A typical transformer, both in conventional transformers currently in use and in embodiments of the present invention, may have multiple secondary blocks. Each secondary block typically has an insulated mounting bracket attached to one end, and each secondary block can have multiple connecting points for secondary or services wires. By this means, a typical transformer can serve multiple service wires.

The terms "secondary component" or "secondary components," as used in this specification and the appended claims, refers to components relating to a secondary side of a transformer, including secondary transformer stations, secondary connecting members, secondary blocks, service wires, and secondary connectors such as secondary elbows.

The term "elbow" as used in this specification and the appended claims, refers to an electrical connector familiar to persons skilled in the art. Elbows are typically found in pad mounted transformers, junction boxes, and other line equipment currently in use. Examples of elbows commonly in use are primary loadbreak elbows. Secondary elbows, including secondary loadbreak elbows, are not know in the prior art but are used in embodiments of transformer assemblies according to the present invention.

The terms "primary power line" and "primary power lines," as used in this specification and appended claims, refer to lines adapted to carry primary power to or from a primary junction module. Accordingly, a primary power line can be a "source" line, in which case it conducts primary power to a primary junction module. Similarly, a primary power line can be a "load" line, in which case the primary power line conducts primary power away from the primary junction module. A person of ordinary skill in the art recognizes that for a transformer assembly to be energized, at least one primary power line electrically connected to the transformer assembly must be a source line. For the purposes of this specification and appended claims, a primary power line is deemed to include an appropriate electrical connector, such as but not limited to a primary loadbreak elbow, adapted to connect the primary power line to a primary terminal.

The terms "service wire," or "service wires" as used in this specification and appended claims, refer to wires electrically connected to secondary blocks in order to carry electrical power at secondary voltage away from a transformer assembly. Service wires are typically used as a source of electrical power at secondary voltage to a user such as a business or home. The term "secondary wire" and "service wire" are sometimes used interchangeably by persons skilled in the art when referring to wires that operate at secondary voltage, which is typically, but not necessarily, falls in a range of 100 to 660 volts.

A First Embodiment Transformer Assembly

A first embodiment transformer assembly 100 is illustrated in FIG. 1. The first embodiment transformer assembly comprises a transformer 102, a medial wall 124, a primary junction module 104, a primary feeder 115, and a secondary connecting member 127. The primary feeder 115 comprises a first primary connector 116 electrically connected to a second primary connector 118 by a connecting conductor 119. The first and second primary electrical connectors are primary loadbreak elbows. The first embodiment transformer assembly further comprises a mounting pad 105 on which the transformer sets. The mounting pad sets on a bottom flange 129 of medial wall, with the medial wall, mounting pad, and transformer residing on top of a ground sleeve 106.

The first embodiment transformer assembly 100 further comprises secondary blocks 125, secondary block brackets 141, and secondary parking ports 134 (partially obscured in FIG. 1 behind secondary connectors 126 in a fourth configuration 130, the secondary connectors in the fourth configuration being shown in dashed line).

The transformer assembly further comprises a first primary parking port 114 (partially obscured behind the second primary connector 118, shown in dashed line in a second primary configuration 122), second primary parking ports 111, a transformer fuse 145, a pressure relief valve 147, a transformer grounding lug 149, a medial wall grounding lug 150, and an oil drain 151.

The first embodiment primary junction module 104 comprises multiple primary terminals 110 and a primary junction module station 121 (the primary junction module station being partially obscured in FIG. 1 behind the first primary load break elbow 116). In this embodiment, primary power lines 112 conduct primary power to or from the primary junction module via the primary terminals 110. One of the primary terminals is a source primary terminal and at least one of the primary terminals is a load primary terminal. The source primary terminal receives primary power from a source primary power line and a load primary terminal energizes its load primary power line to carry primary power away from the primary junction module. The multiple primary terminals are in primary conductivity with each other. Primary voltage for the first embodiment transformer assembly is about 7200 V.

The first embodiment primary junction module achieves primary conductivity with the transformer 102 through a primary feeder, the primary feeder comprising a first primary connector 116, a connecting conductor 119, and a second primary connector 118. The connecting conductor provides primary conductivity between the first and second primary connectors.

In a first primary configuration 120, the first primary connector 116 is installed at the primary junction module station 121, and the second primary connector 118 is installed on a primary transformer station 123 (partially hidden behind the second primary connector that resides in a first primary configuration 120). So configured, the primary transformer station is in primary conductivity with the primary junction module 104, and is thus configured to deliver primary power to the primary side of the transformer. The primary transformer station is in primary conductivity with the primary side of the transformer, and is thus adapted to receive primary power from the primary feeder in order to energize the transformer.

Alternatively, in the second primary configuration 122, the first primary connector 116 is installed on the primary junction module station 121, and the second primary connector 118 is parked at the first primary parking port 114. Typically, the primary feeder is energized in both the first primary configuration and the second primary configuration.

The primary junction module 104 of the first embodiment transformer assembly 100 resides on the medial wall 124, which stands between the transformer 102 and the primary junction module. The primary junction module station 121 resides on the primary junction module 104 and the primary transformer station 123 resides on the transformer 102.

The second primary connector 118 is adapted to adjust from the first primary configuration 120 to the second primary configuration 122 by disengaging from the primary transformer station 123 and installing on the first primary parking port 114. Primary conductivity in a first embodiment transformer assembly between the primary junction module 104 and the transformer 102 is thus interrupted. Accordingly, primary power to the transformer is interrupted without interrupting downstream power to other transformers, junction boxes and other primary line devices, because primary conductivity among the primary terminals 110 persists in the second primary configuration. Typically, but not necessarily, the second primary connector 118 of the first embodiment remains energized in the second primary configuration 122, i.e. a parked position.

Similarly, the second primary connector 118 is readily moved from the second primary configuration 122 to the first primary configuration 120, thereby achieving primary conductivity between the primary junction module 104 and the transformer 102. Typically, the primary side of the transformer is thus energized.

The first embodiment transformer 102 achieves secondary conductivity with, and is thus adapted to deliver secondary power through, any of the three secondary connecting members 127, each secondary connecting member comprising a secondary connector 126 and a secondary conductor 131. The secondary connector of the first embodiment is a secondary loadbreak elbow. Each of three secondary connecting members is electrically connected to one of three secondary blocks 125, as illustrated in FIG. 1. Typically, one secondary connecting member is neutral rather than energized, thus creating a neutral secondary block.

In a third configuration 128, a secondary connector 126 is installed on a secondary transformer station 132 (partially hidden in FIG. 1 behind the secondary connector residing in the third configuration) disposed on the transformer 102. So configured, the secondary transformer station 102 is in secondary conductivity with the secondary block 125, and the secondary connecting member is thus adapted to deliver secondary power from the secondary side of the transformer.

Alternatively, a secondary connector 126 can reside in a fourth configuration 130 (shown in dashed line), wherein the secondary connector 126 is parked at a secondary parking port 134 (partially hidden in FIG. 1 behind a secondary connector 126 residing in a fourth configuration 130). So configured, secondary conductivity between the secondary transformer station 132 and the secondary block is interrupted. The secondary parking port of the first embodiment transformer assembly resides on the medial wall 124.

A secondary connector 126 is readily moved from a third configuration 128 to a fourth configuration 130, by disengaging the secondary connector 126 from a secondary transformer station 132 (partially obscured in FIG. 1 by the secondary connector residing in the third configuration 128), and installing the secondary connector at a secondary parking port 134 (partially obscured in FIG. 1 by the secondary connector residing in the fourth configuration 130). Secondary conductivity (as well as a physical connection) between a secondary block 125 and the transformer 102 is thus interrupted.

With electrical connectivity and physical connectivity between the transformer 102 and secondary blocks 125 absent, the transformer can be removed from its close proximity to the medial wall 124 and secondary blocks without disconnecting or disturbing individual services wires from mechanical terminals (not shown) disposed on the secondary blocks. Note that removal of the transformer also requires that the primary feed 115 be disconnected from the primary transformer station 123, which is typically, but not necessarily, accomplished by placing the primary feed in the second configuration 122. Removal of the transformer is further facilitated by disconnecting the ground wire 108 from the grounding lug 149.

The first embodiment transformer assembly 100 further comprises two quick release locking levers 140, the locking levers being pivotably coupled to the medial wall 124 and disposed in an upright position, the upright position being an unlocked configuration. When the first embodiment transformer 102 is installed in very close proximity to other transformer assembly components to form a compact integrated unit, the locking lever 140 locks the transformer in place by moving about its pivot into a horizontal position (not shown), wherein the locking lever engages an anchor plate 142. The anchor plate is part of, or securely coupled to, the transformer 102. Accordingly, when the locking lever is in a horizontal, locked, position, the transformer is secured in place by the action of the locking levers engaging the anchor plates.

In the first embodiment, the locking levers 140 are pivotably mounted to the medial wall 124, and secure the transformer 102 in place on the mounting pad 105 by engaging the anchor plate. The mounting pad sits between the medial wall flange 129 and the transformer. The mounting pad has no fasteners and is held in place by the medial wall 124 and the transformer 102. The medial wall is secured to the ground sleeve by bolts or other fasteners. A medial wall grounding lug 150 resides on the medial wall.

A Second Embodiment Transformer Assembly

Figure 2:
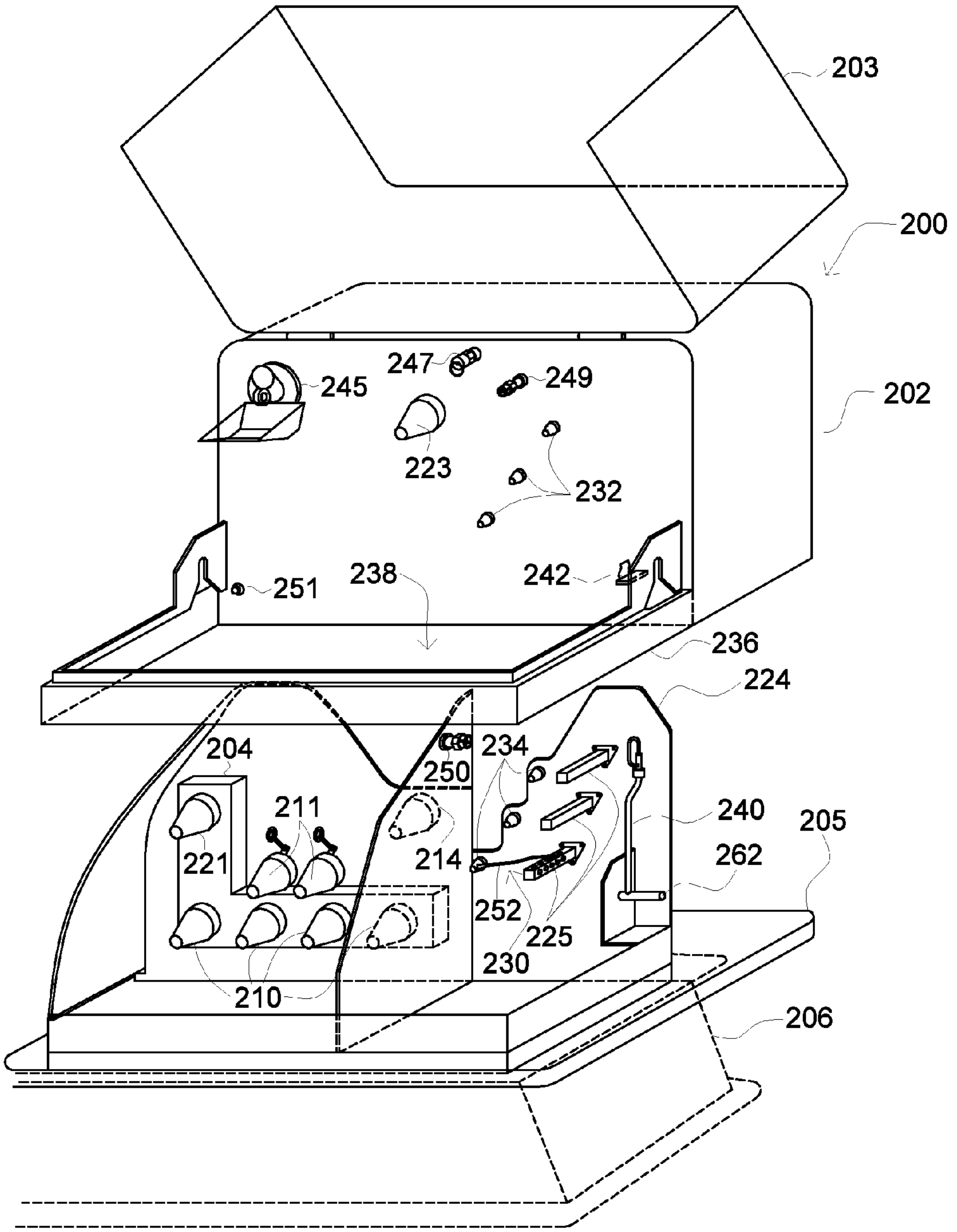
FIG. 2 is an oblique view of a secondary side of a transformer assembly, with the transformer suspended above a medial wall and secondary components, according to one embodiment of the present invention.

A second embodiment transformer assembly 200 is illustrated in FIG. 2. The second embodiment transformer assembly comprises a transformer 202 on which is disposed three secondary transformer stations 232, and a medial wall assembly 224 on which is disposed three secondary blocks 225 and three secondary parking ports 234. The second embodiment transformer assembly further comprises a mounting pad 205 on which resides the transformer, and below which resides a ground sleeve 206.

The second embodiment transformer 202 further comprises a forward base member 236, transformer aperture 238, and a transformer lid 203. The transformer aperture of the second embodiment transformer assembly is adapted to allow components, such as but not limited to, a medial wall assembly 224, secondary blocks 225, secondary connecting members, and a primary junction module to extend through or reside in the transformer aperture.

FIG. 2 illustrates a second embodiment transformer 202 that is suspended above the mounting pad 205 on which the transformer rests when in operation. When set in place, the second embodiment transformer resides in very close proximity to other second embodiment components, such as but not limited to, a medial wall assembly 224, secondary blocks 225, secondary connecting members, and a primary junction module 204. After being set into place on the mounting pad, the second embodiment transformer is readily put in condition of secondary conductivity with secondary blocks 225 by adjusting a secondary connecting member 252 from a fourth configuration 230 to a third configuration (not shown). A secondary connecting member in a fourth configuration 230 is adjusted to a third configuration (not shown) by disengaging a secondary connecting member 252 from its secondary parking port 234 and installing the secondary connecting member on a secondary transformer station 232 disposed on the transformer 202.

Because the second embodiment transformer 202 is adapted to be installed in very close proximity to other components, such as but not limited to a medial wall assembly 224, secondary blocks 225, secondary connecting members 252, or a primary junction module 204, with those enumerated other components extending through or residing in a transformer aperture 238, the second embodiment transformer assembly comprises a compact integrated unit.

The second embodiment transformer assembly 200 further comprises a transformer fuse 245, a primary transformer station 223, a first primary parking port 214, and second primary parking ports 211. The second embodiment further comprises a primary junction module 204, on which reside a primary junction module station 221 and primary terminals 210. Additional transformer assembly components familiar to persons skilled in the art include a pressure relief valve 247, an oil drain 251, a transformer grounding lug 249 mounted on the transformer 202, and a grounding lug 250 mounted on the medial wall 224.

The second embodiment transformer assembly 200 further comprises a locking lever 240 with a locking lever pivot 242 pivotably coupling the lever to the medial wall 224. As illustrated in FIG. 2, the locking lever is configured in an upright position, the upright position being an unlocked configuration. When the second embodiment transformer 202 is installed in very close proximity to other transformer assembly components to form a compact integrated unit, the locking lever 240 locks the transformer in place by moving about its pivot into a horizontal position (not shown), wherein the locking lever engages the anchor plate 242. In the second embodiment transformer assembly, the medial wall 224 is coupled to the ground sleeve and the anchor plate is coupled to the transformer 202. Thus where the first embodiment transformer assembly is configured with the locking lever in a horizontal, locked, position, the transformer is secured in place by the action of the locking lever engaging the anchor plate.

A Third Embodiment Transformer Assembly

Figure 3:
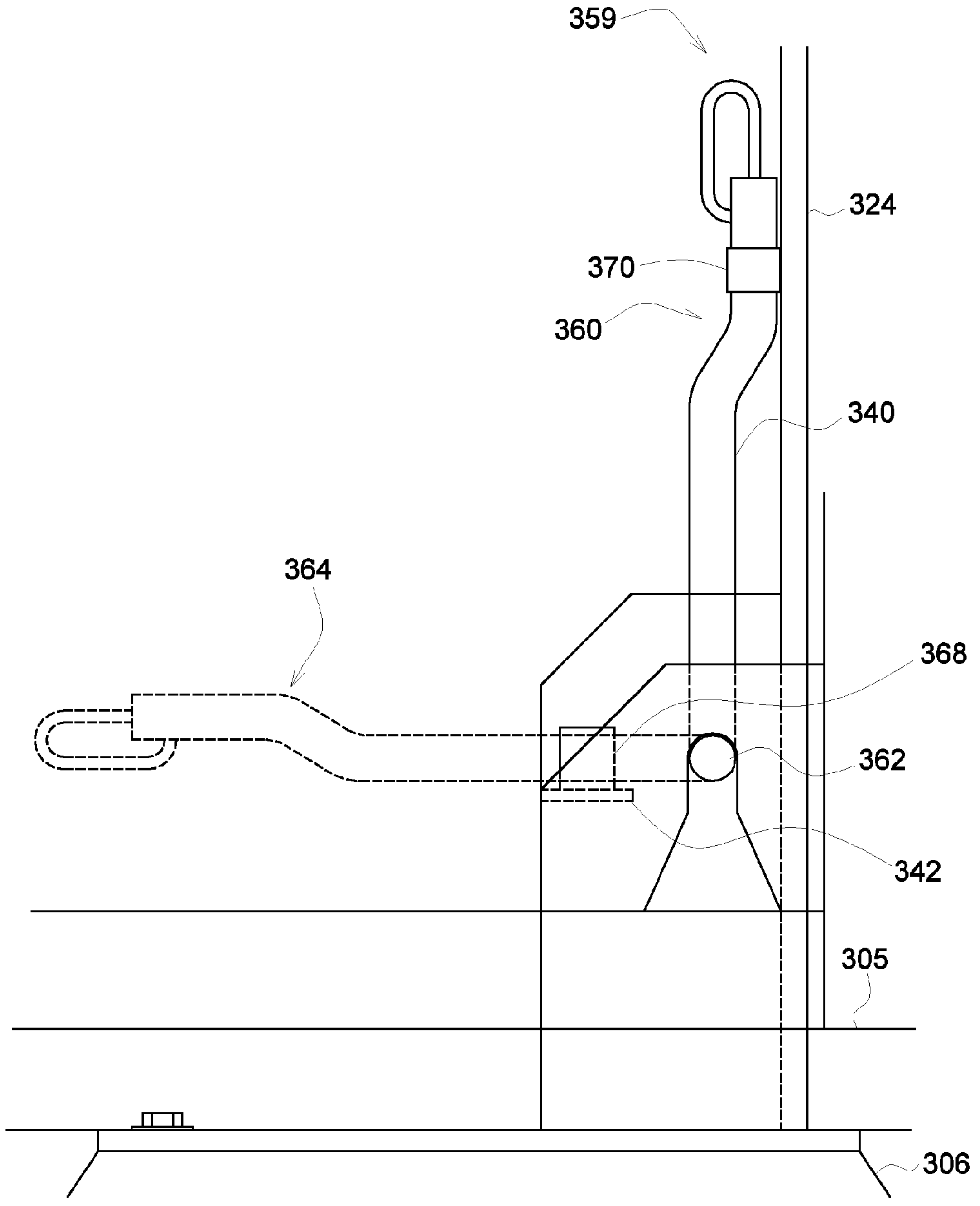
FIG. 3 is a side view of a quick release locking mechanism according to one embodiment of the present invention.

A third embodiment transformer assembly, illustrated in FIG. 3, comprises a quick release locking mechanism 359. The quick release locking mechanism comprises a locking lever 340, the locking lever being pivotably coupled to a medial wall assembly 324 and disposed in an upright position 360, which is an unlocked configuration. The locking lever is secured in the upright position by an upper lever clip 370, and is adapted to lock a transformer in place by the lever moving about its pivot 362 into a horizontal position 364, wherein the locking lever engages an anchor plate 342. A lower lever clip 368 secures the locking lever in the horizontal position.

The anchor plate 342 is coupled to a transformer, and the locking lever is coupled to the medial wall 324, which is fastened to the ground sleeve 306. Thus, where the third embodiment transformer assembly is configured with the locking lever in a horizontal, locked, position, the transformer is secured in place on the mounting pad 305 by the action of the locking lever engaging the anchor plate 342.

Embodiments of transformer assemblies typically, but not necessarily, have two quick release locking mechanisms, one quick release locking mechanism on each of the left and right sides of the assembly. Quick release locking mechanisms are adapted to quickly adjust from a locked position, where a transformer is held securely in place on a mounting pad proximate other transformer assembly components, to an unlocked position, in which the transformer is not held securely in place, and is therefore more adapted to being removed from the transformer assembly. Quick release locking mechanisms typically replace conventional transformer securing means, such as multiple large nuts, and bolts or studs. Quick release locking mechanisms are adapted to adjust from one of a secure or unsecure configuration, to the other of a secure or unsecure configuration, more quickly than conventional transformer securing means.

A Fourth Embodiment Transformer Assembly

Figure 4:
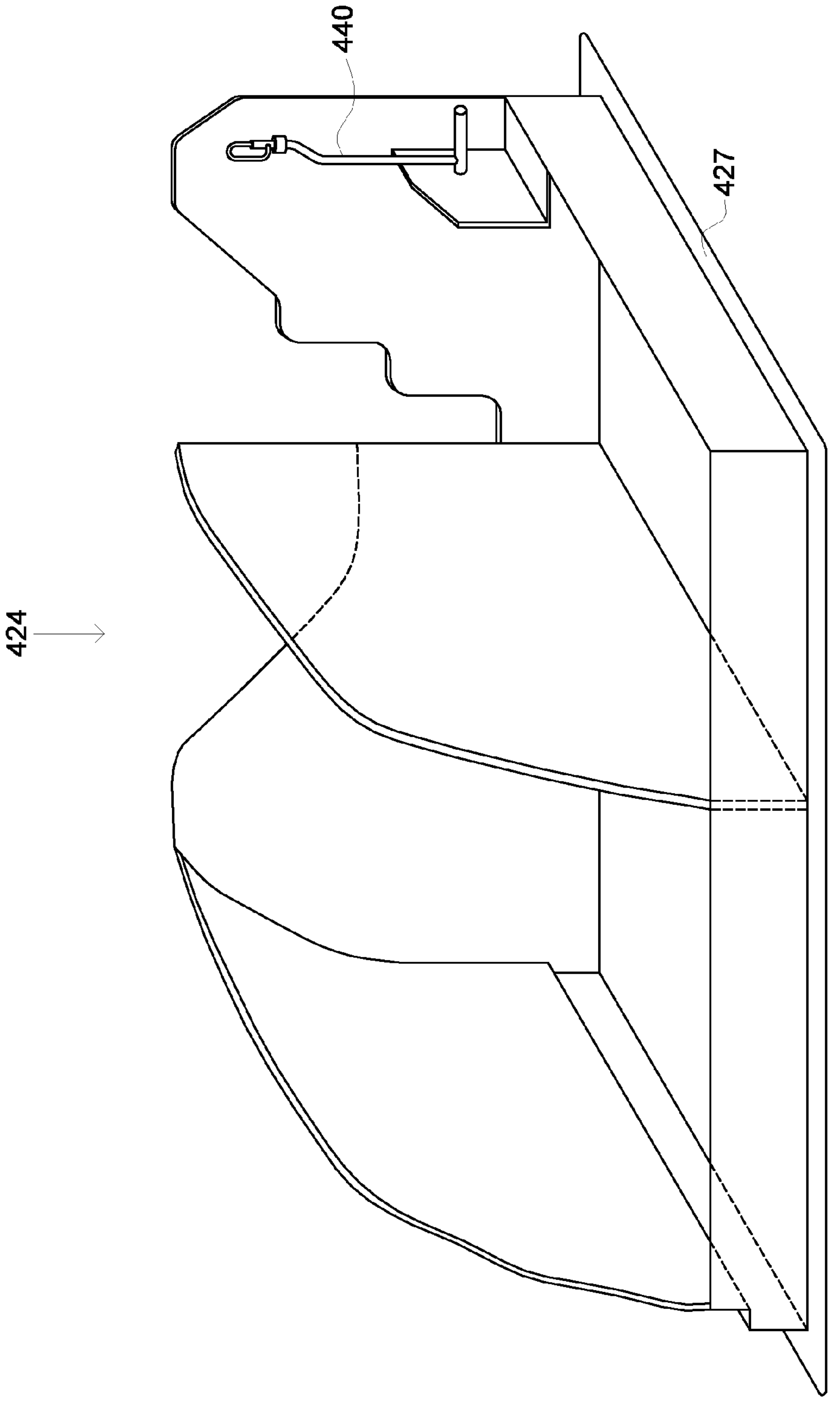
FIG. 4 is an oblique view of a medial wall according to one embodiment of the present invention.

A fourth embodiment transformer assembly is illustrated in FIG. 4. The fourth embodiment transformer assembly comprises a medial wall assembly 424, on which is disposed a locking lever 440. The medial wall assembly includes a flange 427.

The fourth embodiment medial wall assembly 424 resides on and is coupled to a ground sleeve, with the mounting pad residing on the medial wall assembly flange 427. Part of the medial wall assembly typically extends up through an aperture in the mounting pad. In some embodiments, a transformer sets on the mounting pad, with a medial wall and other transformer assembly components extending through a transformer aperture, and an anchor plate acting to couple the transformer to the medial wall by engaging a locking lever 440.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A transformer assembly comprising:

a transformer, the transformer comprising a primary side, a secondary side, and a primary transformer station, the primary transformer station being in primary conductivity with the primary side;

a primary junction module, the primary junction module including;

a source primary terminal, the source primary terminal receiving primary power from a source primary power line;

a load primary terminal, the load primary terminal providing primary power to a load primary power line, the source primary terminal having primary conductivity with the load primary terminal;

a primary junction module station, the primary junction module station having primary conductivity with the source primary terminal;

a primary parking port, the primary parking port being an electrical dead-end adapted to substantially safely receive an electrical connector energized at primary voltage;

a primary feeder, the primary feeder including:

a first primary connector, the first primary connector being coupled directly to and having primary conductivity with the primary junction module station; and a second primary connector, the second primary connector being (i) in primary conductivity with the first primary connector, (ii) configurable in a first primary configuration, wherein the second primary connector is coupled directly to the primary transformer station to provide primary conductivity between the primary junction module and the primary transformer station, and (iii) configurable in a second primary configuration, wherein the second primary connector is coupled directly to the primary parking port, and the primary junction module lacks primary conductivity with the primary transformer station.

2. The transformer assembly of claim 1, wherein the second primary connector is readily adjustable from the first primary configuration to the second primary configuration without interrupting primary conductivity between source primary power line and the load primary power line.

3. The transformer assembly of claim 2, further comprising:

a secondary block, the secondary block being in secondary conductivity with a service line;

a secondary transformer station, the secondary transformer station residing on the transformer and being in secondary conductivity with the secondary side;

a secondary connecting member, the secondary connecting member including a secondary connector, the secondary connector being configurable in a third configuration and in a fourth configuration, the third configuration including the secondary connector being installed on the secondary transformer station and the secondary connecting member providing secondary conductivity between the secondary block and the secondary side, and the fourth configuration including the secondary connector being uninstalled on the secondary transformer station and secondary conductivity lacking between the secondary block and the secondary side.

4. The transformer assembly of claim 2, wherein the first primary connector and the second primary connector are primary loadbreak elbows.

5. The transformer assembly of claim 3, further comprising a medial wall, a vertical portion of the medial wall residing between the transformer and the primary junction module, and the parking port, the primary junction module and the secondary block residing on the medial wall.

6. The transformer assembly of claim 5, wherein the secondary connector is a secondary loadbreak elbow.

7. The transformer assembly of claim 6, further comprising a mounting pad and a ground sleeve, wherein the transformer assembly forms a compact integrated unit with the transformer and the medial wall being supported by the ground sleeve.

8. The transformer assembly of claim 4, further comprising:

a secondary block, the secondary block being in secondary conductivity with a service line;

a secondary transformer station, the secondary transformer station residing on the transformer and being in secondary conductivity with the secondary side;

a secondary connecting member, the secondary connecting member including a secondary connector, the secondary connector being configurable in a third configuration and in a fourth configuration, the third configuration including the secondary connector being installed on the secondary transformer station and the secondary connecting member providing secondary conductivity between the secondary block and the secondary side, and the fourth configuration including the secondary connecter being uninstalled on the secondary transformer station and secondary conductivity lacking between the secondary block and the secondary side.

9. The transformer assembly of claim 8, further comprising a secondary parking port, the fourth configuration including the secondary connector being installed on the secondary parking port.

10. A method of using the transformer of claim 9 comprising:

placing the second primary connector in the first primary configuration;

placing the secondary connector in the third configuration;

adjusting the second primary connector from the first primary configuration to the second primary configuration.

11. The method of claim 10, wherein said adjusting the second primary connector from the first primary configuration to the second primary configuration is performed while the load primary terminal is energized at primary voltage.

12. The method of claim 11, further comprising adjusting the secondary connector from the third configuration to the fourth configuration.

13. The method of claim 12, further comprising removing the transformer from the transformer assembly, wherein both the load primary terminal and the source primary terminal are energized while the transformer is removed from the transformer assembly.

14. A transformer assembly comprising:

a transformer, the transformer including:

a primary side;

a secondary side;

a primary transformer station, the primary transformer station being in primary conductivity with the primary side;

a secondary transformer station, the secondary transformer station being in secondary conductivity with the secondary side;

a primary junction module, the primary junction module including;

a source primary terminal, the source primary terminal receiving primary power from an energized primary power line;

a load primary terminal, the load primary terminal providing primary power to a load primary power line, the source primary terminal having primary conductivity with the load primary terminal;

a primary junction module station, the primary junction module station having primary conductivity with the source primary terminal;

a primary parking port, the primary parking port being an electrical dead-end adapted to substantially safely receive an electrical connector energized at primary voltage;

a secondary parking port, the secondary parking port being an electrical dead-end adapted to substantially safely receive an electrical connector energized at secondary voltage;

a primary feeder, the primary feeder including:

a first primary connector in primary conductivity with the primary junction module station; and a second primary connector in primary conductivity with the first primary connector and with the primary transformer station;

a secondary block in secondary conductivity with a service line; and a secondary connecting member in secondary conductivity with both the secondary transformer station and the secondary block.

* * * * *